United States Patent [19]

Perez et al.

[11] Patent Number: 5,709,948
[45] Date of Patent: Jan. 20, 1998

[54] SEMI-INTERPENETRATING POLYMER NETWORKS OF EPOXY AND POLYOLEFIN RESINS, METHODS THEREFOR, AND USES THEREOF

[75] Inventors: Mario A. Perez, Burnsville; David A. Ylitalo, Stillwater; Thomas M. Clausen, Minneapolis; Robert J. DeVoe, Oakdale; Kevin E. Kinzer, Woodbury; Michael D. Swan, Maplewood, all of Minn.

[73] Assignee: Minnesota Mining and Manufacturing Company, St. Paul, Minn.

[21] Appl. No.: 576,706

[22] Filed: Dec. 21, 1995

Related U.S. Application Data

[63] Continuation-in-part of Ser. No. 522,375, Sep. 20, 1995, abandoned.

[51] Int. Cl.$^6$ ............................. B32B 27/38; C08F 8/00; C08F 283/10; G08L 63/10
[52] U.S. Cl. ........................... 428/413; 428/418; 428/500; 525/107; 525/529; 525/903
[58] Field of Search ...................... 525/107, 529, 525/903; 428/413, 418, 500

[56] References Cited

U.S. PATENT DOCUMENTS

| | | | |
|---|---|---|---|
| 3,505,429 | 4/1970 | Press | 260/857 |
| 4,654,383 | 3/1987 | Corley | 523/462 |
| 4,769,416 | 9/1988 | Gelling et al. | 525/90 |
| 4,783,506 | 11/1988 | Gawin | 525/109 |
| 4,791,144 | 12/1988 | Nagou et al. | 521/90 |
| 4,952,612 | 8/1990 | Brown-Wensley et al. | 522/25 |
| 4,997,720 | 3/1991 | Bourbonais et al. | 428/500 |
| 5,047,456 | 9/1991 | Onwumere et al. | 524/13 |
| 5,059,701 | 10/1991 | Keipert | 556/13 |
| 5,086,086 | 2/1992 | Brown-Wensley et al. | 522/25 |
| 5,089,536 | 2/1992 | Palazzotto et al. | 522/16 |
| 5,095,046 | 3/1992 | Tse | 523/206 |
| 5,100,435 | 3/1992 | Onwumere | 8/115.55 |
| 5,110,867 | 5/1992 | Schutyser et al. | 525/114 |
| 5,191,101 | 3/1993 | Palazzotto et al. | 556/47 |
| 5,198,497 | 3/1993 | Mathur | 525/108 |
| 5,242,980 | 9/1993 | Tse | 523/114 |
| 5,312,867 | 5/1994 | Mitsuno et al. | 525/66 |
| 5,349,027 | 9/1994 | Ueki et al. | 525/331.7 |
| 5,360,877 | 11/1994 | Hwang et al. | 525/903 |
| 5,376,428 | 12/1994 | Palazzotto et al. | 428/143 |
| 5,385,954 | 1/1995 | Palazzotto et al. | 522/29 |
| 5,399,637 | 3/1995 | Willett et al. | 526/142 |
| 5,413,847 | 5/1995 | Kishi et al. | 428/283 |
| 5,464,884 | 11/1995 | Neild et al. | 525/903 |
| 5,476,752 | 12/1995 | Noguchi | 430/287 |
| 5,491,210 | 2/1996 | Onwumere et al. | 528/28 |

FOREIGN PATENT DOCUMENTS

| | | |
|---|---|---|
| 929281 | 10/1992 | South Africa . |
| 736457 | 9/1955 | United Kingdom . |
| 1247116 | 9/1971 | United Kingdom . |

OTHER PUBLICATIONS

Tse, M.F. "Semi–Structural Hot Melt Adhesives Based on Crosslinkable Functionalized Polyolefins," *J. Adhesion*, 1995, vol. 50, pp. 215–232.

Encyclopedia of Polymer Science and Engineering, vol. 8, John Wiley & Sons, NY (1984) pp.279–332.

Negmatov et al., Uzb. Khim ZI, 1990(6), 65–7; CA 115:93689n (with English language translation).

Perepechko et al., Kompoz. Polim. Mater., 1988 vol. 37, 29–32; CA 110:09100e(1989) (with English language translation).

J. Crivello, Advances in Polymer Science, 62, 3 (1984).

*Primary Examiner*—Randy Gulakowski
*Attorney, Agent, or Firm*—Lorraine R. Sherman

[57] ABSTRACT

A curable composition comprises 0.1 to 50 weight percent of a curable epoxy resin, the weight percent being based on the total resin composition, an effective mount of a curative for the curable epoxy resin, 50 to 99.9 weight percent of at least one of a fully prepolymerized hydrocarbon polyolefin resin and a fully prepolymerized functionalized polyolefin resin, the weight percent being based on the total resin composition, wherein said hydrocarbon polyolefin is present in the range of 25 to 99.9 weight percent of the total resin composition and said functionalized polyolefin is present in the range of 0 to 49.9 weight percent of the total resin composition, said composition being free of epoxidized natural and/or synthetic rubber.

28 Claims, No Drawings

SEMI-INTERPENETRATING POLYMER NETWORKS OF EPOXY AND POLYOLEFIN RESINS, METHODS THEREFOR, AND USES THEREOF

This is a continuation-in-part of application Ser. No. 08/522,375, filed Sep. 20, 1995 now abandoned.

FIELD OF THE INVENTION

This invention relates to semi-interpenetrating polymer networks (semi-IPNs) of thermoplastic resins and thermosetting resins prepared by polymerization of a thermosetting resin (i.e., an epoxy resin) in the presence of a fully prepolymerized thermoplastic polymer (i.e., a polyolefin homopolymer or copolymer). The invention also provides a method of preparing semi-IPNs that feature 100% solids processing and latent- or post-curing of the epoxy resin, and uses for the semi-IPNs produced by the method.

BACKGROUND OF THE INVENTION

Blending a small amount of elastomeric or thermoplastic material into a hard thermosetting resin in order to toughen (i.e., increase the ductility of) the thermoset is a common practice in industry. Elastomeric or thermoplastic toughening agents include natural rubbers, polyolefins, and vinyl copolymers such as poly(styrene-co-butadiene). In such cases, the toughening agent is blended in a ratio of from about 1:20 to about 1:4 with a curable thermosetting resin such that the thermoplastic component becomes the dispersed phase in a thermosetting resin continuous phase.

U.S. Pat. No. 3,505,429 describes blends of polyolefins with a large number of "modifying polymers," among which is listed "bisphenol A-epichlorohydrin polymers with reactive epoxy groups," which may be present from 0.01 to 1% by weight of the total polymer composition. Polymerization of the epoxy is not taught. U.S. Pat. No. 4,791,144 describes a polypropylene (polyolefin) film which contains, among other ingredients, an "epoxy type plasticizer in an amount of 40 to 10% by weight based on the sum of the components." Carboxylic acid-functional plasticizers, such as epoxidized soybean oil and epoxidized linseed oil, are preferred. These epoxies are not polymerized.

Semi-interpenetrating polymer networks (semi-IPNs) are defined as polymer networks of two or more polymers wherein one polymer is crosslinked and one is uncrosslinked. Semi-IPNs comprising a number of polymeric systems have been described (*Encyclopedia of Polymer Science and Engineering* Vol. 8; John Wiley & Sons, New York (1984) p. 279–332. A graphic representation of a semi-IPN is shown on page 282, structure (c). Semi-IPNs comprising uncured epoxy resins as the major constituent and, as minor constituents, butadiene-acrylonitrile rubber (British Patent No. 736,457), a crosslinked elastomeric latex (British Patent No. 1,247,116) have been described. Semi-interpenetrating polymer networks of polyolefins and tri-epoxy resins have been studied by Negmatov et at., *Uzb. Khim. Zh.*, 1990 (6), 65-7; CA 115:93689n (1991). No curatives, amounts of components, or processes of making the IPN are disclosed.

Perepechko et at., *Kompoz. Polim. Mater.*, 1988, vol. 37, 29–32; CA 110:09100e (1989) broadly discloses a mixture of polyethylene, maleic anhydride, dicumyl peroxide, and epoxy resin. The polyethylene is crosslinked in the process by the peroxide. It is not a semi-IPN.

An interpenetrating polymer network (IPN) results when two polymers are formed in the presence of each other and result in two independent crosslinked polymer networks. IPNs wherein one of the polymers is an epoxy resin have been described. IPNs have been prepared by polymerizing free-radically polymerizable ethylenically-unsaturated acrylate-type monomers and epoxy monomers simultaneously or sequentially. See, for example, U.S. Pat. Nos. 5,399,637, 5,376,428, 5,086,086 and 4,952,612. In all cases the components are monomeric.

Small amounts of epoxy-functional resins (up to about 10% by weight of the polyolefin) have been successfully blended into polyolefins only when the polyolefin component has been modified by copolymerization or graft polymerization so as to introduce functional groups such as carboxylic acid, carboxylic acid anhydride, carboxylic acid ester, carboxylic acid amide, nitrile, or halogen (particularly chlorine). In such cases, no additional epoxy curative is present and no further curing of the epoxy resin component is reported. This approach has the drawbacks of increased cost of the polyolefin component and, in the case of graft polymerization, detrimental effects of the graft polymerization process itself on the polyolefin (chain scission and other unwanted side reactions). U.S. Pat. Nos. describing representative functionalized polyolefin-epoxy systems include: 5,349,027 (acrylamide functionalized polyolefin by grafting); 5,312,867 (carboxylic acid functionalized polypropylene by grafting); and 4,997,720 (carboxylic acid functionalized polyethylene by copolymerization of ethylene and an unsaturated carboxylic add).

U.S. Pat. No. 4,769,416 describes a composition comprising a polyolefin blended with an epoxidized natural rubber wherein the epoxy functionality is thermally cured in the mixing vessel while the blend is molten.

Investigators have long sought to modify the properties of polyolefins in order to obtain, e.g., improved adhesion to metallic or polar surfaces, increased modulus, lowered melt viscosity, improved dyeability, paintability or pitability, and other desirable properties. The incompatibility of polyolefins and polar resins with one another is well known. Useful semi-IPNs comprising cured epoxy resins and fully prepolymerized polyolefins are not commercially available, in part because of the incompatibility of the two polymer types and in part due to difficulties in controlling or preventing epoxy curing during the mixing process.

The photoinitiated cationic polymerization of epoxides has long been known (see, e.g., J. Crivello, *Advances in Polymer Science*, 62, 3 (1984). Organic aryl sulfonium and aryl iodonium salts are recognized as suitable photoinitiators, i.e. compounds which, after irradiation with light, release protons which initiate, e.g., epoxide polymerization. Also, certain complex iron-arene organometallic salts have been described as photoinitiators for cationic polymerizations (c.f., U.S. Pat. Nos. 5,089,536, 5,191,101, 5,385,954 and 5,059,701). In all these cases, the cationically polymerizable components are monomers.

SUMMARY OF THE INVENTION

Briefly, the present invention provides a curable composition comprising:

a) 0.1 to 50 percent by weight of a curable epoxy resin, the weight percent being based on the total resin composition;

b) an effective mount of a curative for the curable epoxy resin;

c) 50 to 99.9 weight percent of at least one of a fully prepolymerized uncrosslinked hydrocarbon polyolefin resin and a fully prepolymerized uncrosslinked functionalized polyolefin resin, the weight percent being based on the total resin composition, wherein said hydrocarbon polyolefin is present in the range of 25 to 99.9 weight percent of the total resin composition and said functionalized polyolefin is present in the range of 0 to 49.9 weight percent of the total resin composition, said composition being free of both epoxidized natural and synthetic rubber.

In another aspect, the present invention describes a semi-interpenetrating polymer network comprising a thermally cured epoxy .resin, optionally a fully pre-polymerized functionalized polyolefin resin, and a fully pre-polymerized hydrocarbon polyolefin homopolymer or copolymer.

In another aspect, the present invention describes a semi-interpenetrating polymer network comprising a photochemically cationically-cured epoxy resin, optionally a fully pre-polymerized functionalized polyolefin resin, and a fully pre-polymerized polyolefin or a copolymer thereof.

In another aspect, the present invention describes a method of preparing a semi-interpenetrating polymer network comprising the steps of (a) intimately mixing a fully pre-polymerized hydrocarbon thermoplastic polyolefin resin or copolymer thereof; optionally a fully pre-polymerized polyolefin resin comprising polar functionality, a thermally-curable epoxy resin, and at least one high-temperature stable thermal curing agent for the epoxy resins); (b) applying the mixture to a substrate, mold, or storage vessel, or producing a free-standing film; and (c) at any subsequent time, activating the curing agent by supplying sufficient thermal energy to the mixture. Alternatively, the epoxy resin and the curing agent can be added in separate steps.

In another aspect, the present invention describes a method of preparing a semi-interpenetrating polymer network comprising the steps of (a) intimately mixing a fully pre-polymerized polyolefin resin or copolymer thereof; a cationically-polymerizable epoxy resin, and at least one cationic photocatalyst for the epoxy resin, and optionally a fully pre-polymerized polyolefin resin comprising polar functionality; (b) applying the mixture to a substrate, mold, or storage vessel, or processing into a free-standing film; and (c) at a subsequent time, activating the photocatalyst by irradiation of the mixture. Alternatively, the epoxy resin and the cationic photocatalyst can be added in separate steps.

What has not been described in the art, and is provided by the present invention, is a curable composition comprising a curable thermosetting resin, i.e., an epoxy resin, an unmodified fully pre-polymerized hydrocarbon polyolefin resin, and optionally a fully pre-polymerized functionalized polyolefin, wherein the curable epoxy resin preferably is not exposed to curing conditions (i.e., irradiation by light, preferably UV light, or temperatures greater than about 200° C.) until the composition is formed in place, molded, coated, or otherwise prepared in a useful format.

In this application,

"hydrocarbon polyolefin" refers to a fully pre-polymerized uncrosslinked polymeric hydrocarbon bearing essentially no organic functional groups, prepared from homopolymerization and/or copolymerization of an olefinic monomer(s);

"functionalized polyolefin" means a fully pre-polymerized uncrosslinked polymeric hydrocarbon bearing polar organic functional groups; and "semi-interpenetrating polymer networks (semi-IPNs)" are defined as polymer networks of two or more polymers wherein one polymer is crosslinked and one is uncrosslinked.

DETAILED DESCRIPTION OF THE PREFERRED EMBODIMENTS

The present invention provides a curable composition comprising:

a) 0.1 to 50 weight percent, preferably 0.1 to 40, most preferably 0.5 to 20 weight percent, of a curable epoxy resin, the weight percent being based on the total resin composition;

b) an effective amount of a curative for the curable epoxy resin;

c) 50 to 99.9 weight percent, preferably 60 to 99.9, most preferably 80 to 99.5 weight percent, of at least one of a fully prepolymerized hydrocarbon polyolefin resin and a fully prepolymerized functionalized polyolefin resin, the weight percent being based on the total resin composition, wherein said hydrocarbon polyolefin is present in the range of 25 to 99.9 weight percent, preferably 40 to 99.9, most preferably 70 to 99.9 weight percent, of the total resin composition and said functionalized polyolefin is present in the range of 0 to 49.9 weight percent, preferably 0 to 20, most preferably 0 to 10 weight percent of the total resin composition.

The composition of the invention is free of epoxidized natural and synthetic rubber as well as sulfur in its elemental state.

Preferably, blending of the components takes place at a temperature that is below the thermal activation temperature of the catalyst. Preferably, the functionalized polar group comprises at least one O, N, S, P, or halogen atom.

The invention provides cured compositions comprising fully pre-polymerized hydrocarbon polyolefin and functionalized polyolefin resins having improved properties by the inclusion of cured epoxy resin, which form a semi-interpenetrating polymer network. Improved properties include adhesion to metals and polar surfaces (e.g., glass, including glass fibers), common fillers for plastics. (e.g., carbon black, titania, silica, and talc), and fibrous reinforcements for plastics, (e.g., fibers of alumina, silicon carbide, silicon nitride, aromatic polyamides (aramids), and the like), adhesion of paints and protective coatings to the polyolefins, increased modulus of polyolefins, and improved performance in the UL-94 Flammability Test.

In contrast to art-known mixtures comprising epoxy resins reinforced with minor mounts of hydrocarbon polyolefins (including copolymers and natural rubbers), e.g., less than 20% rubber reinforcement in an epoxy matrix, the present invention features fully pre-polymerized hydrocarbon and functionalized polyolefins as the major constituent (e.g., from about 50 to about 99.9% by weight), and epoxy resins as the reinforcing additive. It is believed such epoxy-reinforced polyolefin mixtures have not previously been described. Useful semi-IPNs of the invention preferably comprise from about 0.1 to about 40 weight % epoxy resin, most preferably from about 0.5 to about 20 weight %. Preferred compositions of the invention further comprise from about 0 to about 20% by weight, most preferably 0 to 10% of fully pre-polymerized polyolefins functionalized with at least one polar group, e.g., polyolefins that comprise organic functional groups such as carboxylic acid, hydroxyl, cyano, amide, and halogen, having been so modified preferably via copolymerization or graft copolymerization. Fully pre-polymerized hydrocarbon polyolefins of the preferred compositions are present in the range of 40 to 99.9 percent by weight, and most preferably 50 to 99.9% by weight. The remainder of the matrix may comprise such other additives, fillers, and adjuvants as may be appropriate, as is customary in the art, discussed in further detail below.

The inclusion of epoxy resins in a fully pre-polymerized hydrocarbon polyolefin continuous phase provides the polyolefin with a number of advantageous properties. Curable low-molecular weight epoxy resins serve to decrease the melt viscosity of the polyolefins, imparting improved handling and processing, e.g., easier die extrusion of fibers and more complete filling of small spaces in complex molding or replication processes. Lowered processing temperatures also allow the inclusion of heat-sensitive additives not otherwise usable in high-melting polyolefins, such as, e.g., halogenated flame-retardants. Low-molecular weight epoxy resins improve adhesion of the semi-IPNs to various substrates, in part because such low-molecular weight species can quickly migrate to the resin-substrate interface for improved bonding, perhaps through improved wetting or reaction of the epoxy functionality with functional groups on the substrate surface.

The thermosettable epoxy resins of the invention preferably comprise compounds which contain one or more 1,2-, 1,3- and 1,4-cyclic ethers, which also may be known as 1,2-, 1,3- and 1,4-epoxides. The 1,2-cyclic ethers are preferred. Such compounds can be saturated or unsaturated, aliphatic, alicyclic, aromatic or heterocyclic, or can comprise combinations thereof. Compounds that contain more than one epoxy group (i.e., polyepoxides) are preferred.

Aromatic polyepoxides (i.e., compounds containing at least one aromatic ring structure, e.g., a benzene ring, and more than one epoxy group) that can be used in the present invention include the polyglycidyl ethers of polyhydric phenols, such as Bisphenol A-type resins and their derivatives, epoxy cresol-novolac resins, Bisphenol-F resins and their derivatives, and epoxy phenol-novolac resins; and glycidyl esters of aromatic carboxylic acids, e.g., phthalic acid diglycidyl ester, isophthalic acid diglycidyl ester, trimellitic anhydride trigylcidyl ester, and pyromellitic acid tetraglycidyl ester, and mixtures thereof Preferred aromatic polyepoxides are the polyglycidyl ethers of polyhydric phenols, such as the EPON™ series of diglycidyl ethers of Bisphenol-A, including EPON 828 and EPON 1001F, available commercially from Shell Chemicals, Inc., Houston, Tex.

Representative aliphatic cyclic polyepoxides (i.e., cyclic compounds containing one or more saturated carbocyclic rings and more than one epoxy group, also known as alicyclic compounds) useful in the present invention include the "ERL™" series of alicyclic epoxides commercially available from Union Carbide Corp., Danbury, Conn., such as vinyl cyclohexene dioxide (ERL-4206), 3,4-epoxycyclohexylmethyl-3,4-epoxycyclohexane carboxylate (ERL-4221), 3,4-epoxy-6-methylcyclohexylmethyl-3,4-epoxy-6-methylcyclohexane carboxylate (ERL-4201), bis (3,4-epoxy-6-methylcycylohexylmethyl)adipate (ERL-4289), dipenteric dioxide (ERL-4269), as well as 2-(3,4-epoxycyclohexyl-5,1"-spiro-3",4"-epoxycyclohexane-1,3-dioxane, 4-(1,2-epoxyethyl)-1,2-epoxycyclohexane and 2,2-bis(3,4-epoxycyclohexyl)propane. Preferred alicyclic polyepoxides are the ERL™ series.

Representative aliphatic polyepoxides (i.e., compounds containing no carbocyclic rings and more than one epoxy group) include 1,4-bis(2,3 -epoxypropoxy)butane, polyglycidyl ethers of aliphatic polyols such as glycerol, polypropylene glycol, 1,4-butanediol, and the like, and the diglycidyl ester of linoleic dimer acid.

A wide variety of commercial epoxy resins are available and are listed or described in, e.g., the *Handbook of Epoxy Resins*, by Lee and Neville, McGraw-Hill Book Co., New York (1967), *Epoxy Resins, Chemistry and Technology*, Second Edition, C. May, ed., Marcell Decker, Inc., New York (1988), and *Epoxy Resin Technology*, P. F. Bruins, ed., Interscience Publishers, New York, (1968). Any of the epoxy resins described therein may be useful in preparation of the semi-IPNs of the invention.

It is within the scope of the present invention to include, as a bireactive comonomer, compounds having both epoxy functionality and at least one other chemical functionality, such as, e.g., hydroxyl, acrylate, ethylenic unsaturation, carboxylic acid, carboxylic acid ester, and the like. An example of such a monomer is Ebecryl™ 3605, commercially available from UCB Radcure, Inc., Atlanta, Ga., a bisphenol-A-type monomer having both epoxy and acrylate functionality.

Curatives of the present invention can be photocatalysts or thermal curing agents.

Catalysts of the present invention (also known as "initiators," the terms being used interchangeably in the present invention) preferably can be activated by photochemical means. Known photocatalysts are of two general types: onium salts and cationic organometallic salts, and both are useful in the invention.

Onium salt photoinitiators for cationic polymerizations include iodonium and sulfonium complex salts. Useful aromatic iodonium complex salts are of the general formula:

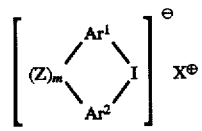

wherein $Ar^1$ and $Ar^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, a carbon-carbon bond,

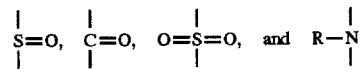

wherein R can be aryl (having from 6 to about 20 carbon atoms, such as phenyl) or acyl (having from 2 to about 20 carbon atoms, such as acetyl, or benzoyl), and

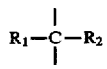

wherein $R_1$ and $R_2$ are selected from the group consisting of hydrogen, alkyl radicals having from 1 to about 4 carbon atoms, and alkenyl radicals having from 2 to about 4 carbon atoms;

m is zero or 1; and

X has the formula $DQ_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{-2}$, $ZrF_6^-$, $CF_3SO_3^-$ and the like. Preferably, the anions are $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$, and $SbF_5OH^-$.

The $Ar_1$ and $Ar_2$ aromatic groups may optionally comprise one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference. The preferred aromatic iodonium complex salts are $(Ar)_2I\ PF_6$ and $(Ar)_2I\ SbF_6$.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt initiators suitable for use in the invention are of the general formula

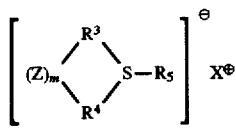

wherein
$R_3$, $R_4$ and $R_5$ can be the same or different, provided that at least one of the groups is aromatic. These groups can be selected from the group consisting of aromatic moieties having from 4 to about 20 carbon atoms (e.g., substituted and unsubstituted phenyl, thienyl, and furanyl) and alkyl radicals having from 1 to about 20 carbon atoms. The term "alkyl" includes substituted alkyl radicals (e.g., substituents such as halogen, hydroxy, alkoxy, and aryl). Preferably, $R_3$, $R_4$ and $R_5$ are each aromatic; and Z, m and X are all as defined above with regard to the iodonium complex salts.

$R_3$, $R_4$ or $R_5$ is an aromatic group, it may optionally have one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroanimonate and p-(phenyl(thiophenyl) diphenylsulfonium hexafluoroanimonate are the preferred sulfonium salts. Useful sulfonium salts are described more fully in U.S. Pat. No. 4,256,828.

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

Suitable photoactivatable organometallic complex salts useful in the invention include those described in U.S. Pat. Nos. 5,059,701, 5,191,101, and 5,252,694, each of which is incorporated herein by reference. Such salts of organometallic cations have the general formula:

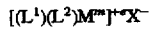

wherein
$M^m$ represents a metal atom selected from elements of periodic groups IVB, VB, VIB, VIIB and VIII, preferably Cr, Mo, W, Mn, Re, Fe, and Co;

$L^1$ represents none, one, or two ligands contributing $\pi$-electrons that can be the same or different ligand selected from the group consisting of substituted and unsubstituted acyclic and cyclic unsaturated compounds and groups and substituted and unsubstituted carbocyclic aromatic and heterocyclic aromatic compounds, each capable of contributing two to twelve $\pi$-electrons to the valence shell of the metal atom M. Preferably, $L^1$ is selected from the group consisting of substituted and unsubstituted $\eta^3$-allyl, $\eta^5$-cyclopentadienyl, $\eta^7$-cycloheptatrienyl compounds, and $\eta^6$-aromatic compounds selected from the group consisting of $\eta^6$-benzene and substituted $\eta^6$-benzene compounds (e.g., xylenes) and compounds having 2 to 4 fused rings, each capable of contributing 3 to 8 $\pi$-electrons to the valence shell of $M^m$;

$L^2$ represents none or 1 to 3 ligands contributing an even number of $\sigma$-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex; and e is an integer having a value of 1 or 2, the residual charge of the complex cation;

X is a halogen-containing complex anion, as described above.

Examples of suitable salts of organometallic complex cations useful as photoactivatable catalysts in the present invention include:
($\eta^6$-benzene)($\eta^5$-cyclopentadienyl)Fe$^{+1}$ SbF$_6^-$
($\eta^6$-toluene)($\eta^5$-cyclopentadienyl)Fe$^{+1}$ AsF$_6^-$
($\eta^6$-xylene)($\eta^5$-cyclopentadienyl)Fe$^{+1}$ SbF$_6^-$
($\eta^6$-cumene)($\eta^5$-cyclopentadienyl)Fe$^{+1}$ PF$_6^-$
($\eta^6$-xylenes (mixed isomers))($\eta^5$-cyclopentadienyl)Fe$^{+1}$ SbF$_6^-$
($\eta$6-xylenes (mixed isomers))($\eta^5$-cyclopentadienyl)Fe$^{+1}$ PF$_6^-$
($\eta^6$-o-xylene)($\eta^5$-cyclopentadienyl)Fe$^{+1}$ CF$_3$SO$_3^-$
($\eta^6$-m-xylene)($\eta^5$-cyclopentadienyl)Fe$^{+1}$ BF$_4^-$
($\eta^6$-mesitylene)($\eta^5$-cyclopentadienyl)Fe$^{+1}$ SbF$_6^-$
($\eta^6$-hexamethylbenzene)($\eta^5$-cyclopentadienyl)Fe$^{+1}$ SbF$_5$OH$^-$ and
($\eta^6$-fluorene)($\eta^5$-cyclopentadienyl)Fe$^{+1}$ SbF$_6^-$.

Preferred salts of organometallic complex cations useful in the invention include one or more of the following: ($\eta^6$-xylenes (mixed isomers))($\eta^5$-cyclopentadienyl)Fe$^{+1}$ SbF$_6^-$, ($\eta^6$-xylenes (mixed isomers))($\eta^5$-cydopentadienyl)Fe$^{+1}$ PF$_6^-$, ($\eta^6$-xylene)($\eta^5$-cyclopentadienyl)Fe$^{+1}$ SbF$_6^-$, and ($\eta^6$-mesitylene)($\eta^5$-cyclopentadienyl)Fe$^{+1}$ SbF$_6^-$.

Optionally, the organometallic salt initiators can be accompanied by an accelerator such as an oxalate ester of a tertiary alcohol. The accelerator preferably comprises from about 0.1 to about 4% by weight of the total polymerizable mixture (thermoplastic component, thermosetting component and catalyst(s)), more preferably about 60% of the weight of the metallocene initiator, as described in U.S. Pat. No. 5,252,694, incorporated herein by reference.

Useful commercially available initiators include FX-512™, an aromatic sulfonium complex salt (3M Company, St. Paul, Minn.), UVI™-6974, an aromatic sulfonium complex salt (Union Carbide Corp., Danbury, Conn.) and IRGACURE™ 261, a cationic organometallic complex salt (Ciba Geigy Chemicals, Hawthorne, N.Y.).

Photoinitiators useful in the invention can be present in an amount in the range of 0.01 to 10 weight percent, preferably 0.01 to 5, most preferably 0.1 to 2 weight percent based on total resin composition.

Certain thermally-activated curing agents for epoxy resins (e.g., compounds that effect curing and crossing of the epoxide by entering into a chemical reaction therewith) are useful in the present invention. Preferably, such curing agents are thermally stable at temperatures at which mixing of the components takes place.

Suitable thermal curing agents include aliphatic and aromatic primary and secondary amines, e.g., di(4-aminophenyl)sulfone, di(4-aminophenyl)ether, and 2,2-bis-(4-aminophenyl)propane; aliphatic and aromatic tertiary amines, e.g., dimethylaminopropylamine and pyridine; fluorene diamines, such as those described in U.S. Pat. No. 4,684,678, incorporated herein by reference; boron trifluoride complexes such as $BF_3 \cdot Et_2O$ and $BF_3 \cdot H_2NC_2H_4OH$; imidazoles, such as methylimidazole; hydrazines, such as adipohydrazine; and guanidines, such as tetramethylguanidine and dicyandiamide (cyanoguanidine, also commonly known as DiCy). It is to be understood that a careful choice among these curing agents must be made, since many of them would be unsuitable for use when high-melting polyolefin components are present, but they may be useful in preparing semi-IPNs of the invention that comprise low-melting polyolefins and epoxy resins.

Thermal curative can be present in an amount such that the ratio of epoxy equivalents to thermal curative equivalents is in the range of 0.9:1 to 2:1.

Homopolymeric polyolefins useful in the invention include polyethylene, polypropylene, poly-1-butene, poly-1-pentene, poly-1-hexene, poly-1-octene and related polyolefins. Preferred homopolymeric polyolefins include polyethylene (e.g., Dow HDPE 25455™, available from Dow Chemical Co., Midland, Mich.) and polypropylene (e.g., Shell DS5D45™, available from Shell Chemicals, Houston, Tex., or Exxon Escorene™ 3445 and 3505G, available from Exxon Chemicals, Houston, Tex.). Also useful are copolymers of these alpha-olefins, including poly(ethylene-co-propylene) (e.g., SRD7-462™, SRD7-463™ and DS7C50™, each of which is available from Shell Chemicals), poly(propylene-co-1-butene) (e.g., SRD6-328™, also available from Shell Chemicals), and related copolymers. Preferred copolymers are poly(ethylene-co-propylene). Also useful is the Vestoplast™ series of polyolefins, available from Hüls America Inc., Piscataway, N.J.

The semi-IPNs of the invention also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the Elvax™ series, commercially available from DuPont Chemicals, Wilmington, Del., the Elvamide™ series of ethylene-polyamide copolymers, also available from DuPont, and Abcite 1060WH™, a polyethylene-based copolymer comprising approximately 10% by weight of carboxylic acid functional groups, commercially available from Union Carbide Corp., Danbury, Conn. Examples of graft-copolymerized functionalized polyolefins include maleic anhydride-grafted polypropylene, such as the Epolene™ series of waxes commercially available from Eastman Chemical Co., Kingsport, Tenn. and Questron™, commercially available from Himont U.S.A., Inc., Wilmington, Del.

Various adjuvants can also be added to the compositions of the invention to alter the physical characteristics of the cured semi-IPN. Included among useful adjuvants are thixotropic agents such as fumed silica; pigments to enhance color tones such as ferric oxide, carbon black and titanium dioxide; fillers such as mica, silica, acicular wollastonite, calcium carbonate, magnesium sulfate and calcium sulfate; clays such as bentonite; glass beads and bubbles, reinforcing materials such as unidirectional woven and nonwoven webs of organic and inorganic fibers such as polyester, polyimide, glass fibers, polyamides such as poly(p-phenylene terephthalamide), carbon fibers, and ceramic fibers. Amounts up to about 200 parts of adjuvant per 100 parts of polyolefin-epoxy composition can be used.

Semi IPNs of the invention can be prepared in either of two ways: batch and continuous processing.

Batch processing can be accomplished by adding solid polyolefin, typically in pellet form, to a preheated mixer, such as a Brabender mixer (C. W. Brabender Instruments, Inc., South Hackensack, N.J.) equipped with, e.g., cam or sigma blades, at a temperature that is less than the thermal activation temperature of the curative. After stirring for about 5 minutes, the fully pre-polymerized polyolefin is melted and a mixture of liquid epoxy resin and curative for the epoxy resin is added with continued stirring. Typically, an immediate reduction in torque and melt temperature is noticed as the polyolefins and epoxy are blended. The resultant mixture is stirred to ensure complete mixing and removed from the mixer while still molten. The mixture can then be molded, formed, shaped or pressed into a desired final configuration and irradiated and/or heated to cure and crosslink the epoxy resin component. In particular, when a thin sheet or film is desired, the molten mass can be pressed in a heated flat-plate press, such as a Carver laboratory press (F. Carver, Inc., Wabash, Ind.).

Continuous processing can be accomplished using an extruder, e.g., a twin-screw extruder, equipped with a downstream port, a static mixer and an appropriate output orifice (film die, sheet die, fiber die, profile die, etc.) and a take-up roll and wind-up roll(s), as appropriate. Solid polyolefin is added to the input end of the extruder and processed using a temperature profile that is appropriate for the polyolefin and that is less than the thermal activation temperature of the epoxy curing agent. Take-up line speed is adjusted as appropriate for the output (sheet, fiber, etc.), typically from about 0.5 m/min to about 200 m/min.

In the cases where thermal curing of the epoxy is desirable immediately after extrusion, i.e., before the polyolefin cools and crystallizes, further heating of the extrudate can take place directly at the die orifice or at a casting wheel. When it is desired that epoxy cure take place after the polyolefin cools and crystallizes, the heat source(s) can be located just prior to the take-up roll. Finally, it may be desirable that no epoxy curing take place after extrusion, in which case the heating devices may be absent.

In the case where photocuring of the epoxy is desirable immediately after extrusion, i.e., before the polyolefin cools and crystallizes, UV irradiation of the heated extrudate can take place directly at the die orifice. Irradiation can be accomplished by any number of commercially-available UV sources, such as one or more Fusion Systems D or H bulbs (available from Fusion UV Curing Systems, Rockville, D) or Sylvania BL 350 bulbs. When it is desired that epoxy cure take place after the polyolefin cools and crystallizes, the light source(s) can be located just prior to the take-up roll. Finally, it may be desirable that no immediate epoxy curing take place after extrusion, in which case the irradiation devices may be absent.

It is within the scope of the invention that a polyolefin-epoxy blended film, obtained from a sheet die, may be drawn either uniaxially or biaxially as it emerges from the die. Cure, as above, may take place either before or after such drawing is complete.

Compositions of the present invention can be useful in a number of applications that take advantage of the unique properties that result from preparation of semi-IPNs. The unique combination of high adhesiveness imparted by epoxy resins and high chemical inertness of polyolefins leads to materials that have utility as coatings for pipes and other metallic surfaces subject to harsh, aggressive chemical environments. Thus, coatings prepared from compositions of the invention may be used on the exteriors of steel pipes and on iron or steel rods used in reinforcing concrete, commonly known as "rebar." Such coatings may also be applied to the interior of pipes to protect them from corrosive chemicals. Fibers extruded from the semi-IPNs are useful as, e.g., brush bristles, where low creep, high modulus, and high chemical resistance are important. Melt-processable compositions may be used as adhesives, especially when latent or post-application curing is a needed attribute.

Semi-IPN films of the invention may be applied as protective and/or decorative coatings to a wide variety of substrates, including metals such as steel, aluminum and copper, and polymeric materials such as polyolefins and polyimides (by themselves or as coatings on other substrates). When applied to metal substrates, films of the invention are advantageously applied in the molten state or at an elevated temperature such that the substrate is thoroughly wetted prior to the epoxy curing step in order to maximize adhesion to the substrate.

Semi-IPNs of the invention may be extruded in fiber (including filament) form, and the fibers may then be processed into both woven and nonwoven articles having improved properties over those prepared solely from polyolefins. Preparation of nonwoven melt-blown webs of fibers is taught in U.S. Pat. No. 4,118,531, incorporated by reference herein, and in Wente, Van A., "Superfine Thermoplastic Fibers," *Industrial Chemistry*, vol. 48, p. 1342 (1956) and in Report No. 4364 of the Naval Research Laboratories, "Manufacture of Superfine Organic Fibers," by Wente, Van A., Boone, C. D., and Fluharty, E. L., published May 25, 1954. For example, nonwoven articles prepared from the semi-IPN of the invention are able to obtain a "UL-94 V-0" rating in the Underwriters Laboratories "Vertical Burn Test," whereas polyolefin nonwovens typically are rated "UL-94 V-2." Additionally, polyolefin nonwoven articles may be coated (e.g., sprayed, dipped, roll-coated) with molten semi-IPN of the invention to produce nonwoven articles exhibiting improved properties. Advantageously, the semi-IPN adheres strongly to the polyolefin nonwoven fabric, in contrast to many other coatings currently in use.

Free-standing films prepared from the semi-IPN of the invention may find use in applications where increased thermal stability after orientation or stretching is desired, such as in electrical capacitors, tape backings, magnetic tape substrates, and the like. In particular, films of the invention can be used advantageously as backings for adhesive tapes that use, e.g., acrylic-type adhesives. The polar, cured epoxy resin component can provide enhanced adhesion of the acrylic adhesive to the film backing.

Semi-IPNs of the invention can also be useful as expandable beads or microbeads, providing improved products relative to those prepared using known gas-filled thermally-expandable polyolefin beads. Beads prepared using the semi-IPN can improve structural strength, and can impart improved strength to foams (e.g., foam tapes, foamed constructions, molded foamed parts, and the like) prepared using them.

Objects and advantages of this invention are further illustrated by the following examples, but the particular materials and amounts thereof recited in these examples, as well as other conditions and details, should not be construed to unduly limit this invention.

EXAMPLES

Test Procedures
Tensile Modulus, Tensile Strength

Tensile modulus and tensile strength were measured using an Instron tensile testing machine (Instron Corp., Park Ridge, Ill.), model 1122, equipped with a 5KN load cell, model 2511-317. A cross head speed of 0.05 m/min was used for all testing. Free-standing sample strips measuring 12.7 cm×6.4 mm×0.25 mm were used. Tests were performed at 22° C. and 100° C. The strips were exposed to 3.1 J/cm$^2$ of radiant energy from TLD 15W/03 (Phillips, Holland), 350BL (Sylvania-GTE; US) or fusion D or H bulbs (Fusion UV Curing Systems, Rockville, Md.). Samples were then placed in an oven at 100° C. for fifteen minutes to ensure cure.

Overlap Shear Strength

Overlap Shear measurements were obtained essentially according to ASTM D1002-94, "Apparent Shear Strength of Single-Lap-Joint Adhesively Bonded Metal Specimens by Tension Loading." Cold rolled steel coupons measuring 11.43 cm×2.54 cm×3.2 mm were thoroughly cleaned with methyl ethyl ketone and heated on a hot plate to temperatures of from about 185° to about 250° C. Films having thicknesses of from about 0.25 and 0.75 mm were applied to the hot metal surface using a silicon rubber roller and allowed to melt. Films containing photocatalysts were exposed, while molten, to 3.1 J/cm$^2$ of radiant energy from TLD 15W/03 (Phillips, Holland) or 350BL (Sylvania-GTE; US) UV-emitting lamps. The two cured halves were joined together, film side-to-film side, by means of Scotchkote™ 134 Epoxy (3M, St. Paul, Minn.). The area of overlap was 2.54 cm$^2$. A very thin layer of Scotchkote™ 134 was dusted on to one half and the other half placed atop it at 185° C. Samples containing thermal curing systems were made by placing a piece of the film to be tested between two coupons at 225° C. for five minutes. Samples were then removed from the heat, cooled to 22° C. Peak loads and strain to break were recorded from an Instron machine with a 44.5 KN load cell.

Dynamic Mechanical Analysis (DMA)

Samples were free standing strips prepared as described in "Tensile Modulus," above. A Seiko Instruments DMA 200 Rheometer (Seiko Instruments, Torrance, Calif.) equipped with a tensile sample fixture was used. Separation between jaws was 20 mm. The temperature ramp was 2° C. per minute from −80° to 160° C. Four frequencies were probed: 1, 10, 50, and 100 Hz.

Differential Scanning Calorimetry (DSC)

Epoxy/polyolefin mixtures were prepared by weighing out known amounts of ground fully-cured polyolefin and liquid epoxy in stainless steel Perkin-Elmer DSC pans (Perkin-Elmer Corp., Norwalk, Conn.). The pans were hermetically sealed and placed in a 200° C. oven for 30 minutes to allow the polyolefin and epoxy to obtain homogeneity. The specimens were allowed to cool to 22° C. and reweighed to confirm that no weight loss had occurred during the heat dwell step. In all cases, no more than 0.2% of sample weight loss was measured. A DSC scan was performed on each of the specimens using a Seiko SSC/ 5220H DSC instrument (Seiko Instruments, Torrance, Calif.) in which the samples were held at 200° C. for 10 minutes followed by cooling from 200° C. to 0° C. at 10° C./min. Specimens were reweighed a second time to verify that no weight loss had occurred during the DSC scan.

Thermomechanical Analysis; Orientation/Shrinkage

Film samples were prepared by stretching uncured epoxy/cured polyolefin film originally measuring 10 mm×3.5 mm×0.25 mm to 200% elongation in an Instron tensile tester at 150° C., followed by exposure to Sylvania 350BL UV lamps for 5 minutes to the heated, stretched samples. Tests were performed in a Perkin-Elmer 7 Series Thermomechanical Analyzer equipped with an extension probe (Perkin-Elmer Corp., Norwalk, Conn.). Samples were heated from 25° to 160° C. at 10° C./min under an applied force of 50 Nm.

Dielectric Constant

Dielectric constant measurements were taken essentially according to ASTM D257-93, using Keithly 237 and 8008 resistivity fixtures and a 60-second electrification time at 500 volts and 45% relative humidity. 500 Khz measurements were taken with an HP4284A Precision LCK meter equipped with an HP1645 1B Dielectric Test Fixture (Hewlett-Packard Co., Palo Alto, Calif.). 900 MHz measurements were taken with an HP4291 Impedance Material Analyzer.

Surface Properties

Surface tension measurements were obtained using a standard series of surface tension liquids (Sherman Treaters, Inc., Mississauga, Ontario, Canada). One drop of each liquid is placed upon the surface to be tested, and the surface tension at which wetting is observed is recorded.

Flame Retardancy

The test is modeled after the UL-94 "Vertical Burn Test." A sample measuring 1.27 cm×12.7 cm was exposed vertically and from the bottom to a Bunsen burner flame for 10 seconds. Another 10 second application was made if the sample self-extinguished within 30 seconds. A dry absorbent surgical cotton pad was placed 30.5 cm beneath the sample. If flaming droplets did not ignite the cotton and the average burning time was less than 5 seconds, the material was classified "94 V-O." If the average was less than 25 seconds the classification was "94 V-1." If the cotton was ignited, even if the material was extinguished, the material was classified as "94 V-2." Preferably, the semi-IPNs of the invention have a rating of "94V-1", more preferably "94V-0".

EXAMPLE 1

Adhesives

Melt processable semi-IPNs were prepared in a twin-screw extruder. Poly(propylene-co-ethylene) (D87C50, 20% ethylene, available from Shell Chemicals, Houston, Tex.) was added to a corotating twin screw extruder equipped with downstream metering equipment, a static mixer, and a 20.3 cm sheet die. The extruder was run at 90 rpm with a temperature profile of (°C.): 198—200—200— —230— 266—266—187. The overall average residence time was approximately 12 minutes. At the downstream port, a mixture of epoxy resin, as shown in Table 1, and 2 wt % triarylsulfonium hexafluorophosphate (FX-5 12 Activated Epoxy Curative, available from 3M Company, St. Paul, Minn.) (based on the weight of epoxy resin), was added. The extruded mixture was collected at a line speed of 0.77–1.0 m/min onto a take-up wheel maintained at 90° C., then collected on a wind-up wheel. Two samples of each of the formulations of the cooled mixture were obtained. Samples were stored in the dark for 72 days, then overlap shear strengths were measured, and the results are shown in Table 1. All sample failure was cohesive. Epoxy resin ERL™-4221 is 3,4-epoxycyclohexylmethyl-3,4-epoxycyclohexane carboxylate, available from Union Carbide, Danbury, Conn.; EPON™-828 is Bisphenol-A diglycidyl ether (DGEBA, available from Shell Chemicals, Houston, Tex.).

TABLE 1

| Overlap Shear Test | | | |
|---|---|---|---|
| Epoxy Resin | Wt. % | Peak Load, psi | Peak Load, MPa |
| ERL-4221 | 4 | 2187 | 15.1 |
| ERL-4221 | 15 | 1607 | 11.1 |
| ERL-4221 | 22 | 1077 | 7.4 |
| ERL-4221 | 33 | 739 | 5.1 |
| EPON-828 | 5 | 1993 | 13.7 |
| EPON-828 | 14 | 1680 | 11.6 |

The data of Table 1 show that semi-IPNs of the invention provided coatings comprised predominately of polyolefins that had excellent adhesion to a clean steel substrate. In addition, the example shows that excellent latent cure adhesives were obtained according to the invention.

EXAMPLE 2

Electrical Properties An extruded sample of poly (propylene-co-ethylene) (DS7C50, available from Shell Chemicals) admixed with epoxy resin was prepared in the manner described in Example 1. Samples were extruded, then cured by passing them under Sylvania 350 BL UV-emitting bulbs at 7.5 ft/min while the sample was molten 185° C.) or under UV-emitting Fusion D Bulbs after cooling to 25° C. and crystallization of the polypropylene. Dielectric constant measurements were taken, as shown.

TABLE 2

| Dielectric Constants | | | | | |
|---|---|---|---|---|---|
| Epoxy Resin | % Epoxy | Temp., °C. | Sample Thickness, mm | Dielectric Constant, 500 Khz | Dielectric Constant, 900 MHz |
| none (Comparative) | 0 | 25 | 0.26 | 2.24 | 2.22 |
| ERL-4221 | 4 | 25 | 0.34 | 2.16 | 2.10 |
| ERL-4221 | 15 | 25 | 0.27 | 2.04 | 2.12 |
| ERL-4221 | 22 | 25 | 0.37 | 1.78 | 1.83 |
| ERL-4221 | 33 | 25 | 0.46 | 1.76 | 1.88 |
| EPON-828 | 14 | 25 | 0.30 | 1.73 | 1.97 |
| ERL-4221 | 4 | 185 | 0.35 | 1.96 | 2.14 |
| ERL-4221 | 15 | 185 | 0.27 | | 2.22 |
| ERL-4221 | 22 | 185 | 0.37 | | 2.15 |
| ERL-4221 | 33 | 185 | 0.38 | | 2.03 |
| EPON-828 | 5 | 185 | 0.30 | | 2.11 |
| EPON-828 | 14 | 185 | 0.27 | 2.00 | 2.15 |
| EPON-828 | 29 | 185 | 0.39 | | 2.00 |

The data of Table 2 show that semi-IPNs comprising a significant amount of epoxy resin exhibited dielectric constants that were equal to or less than pure polypropylene. A low dielectric constant allows for superior insulation from current-carrying conductors and from soil in which, e.g., a metal pipe or conduit may be buried.

EXAMPLE 3

Surface Properties

Samples of semi-IPNs comprising poly(polypropylene-co-ethylene) (D87C50, available from Shell Chemicals) and various wt % epoxy resins, as shown in Table 3, were prepared by extrusion, as described in Example 1, using 2 wt % FX-512 catalyst in each sample. The materials were cured by passing them under Fusion D bulbs at 7.5 ft/min, cooled to 23° C., then the surface energy of each formulation was measured. The results are presented in Table 3.

TABLE 3

| Epoxy Resin | Surface Energy | |
|---|---|---|
| | Wt. % | Surface Energy, dynes/cm |
| -none (comparative) | — | <30 |
| ERL-4221 | 4 | 32 |
| ERL-4221 | 15 | 32 |
| ERL-4221 | 22 | 33 |
| ERL-4221 | 33 | 36 |
| EPON-828 | 5 | 31 |
| EPON-828 | 14 | 33 |

The data of Table 3 show that increased amounts of epoxy resin markedly increased the surface energy of the semi-IPN. Materials having high surface energy tend to exhibit good adhesion to and wettability by paints, binders, adhesives and resins. The semi-IPNs of the invention showed higher surface energies than pure polyolefin.

EXAMPLE 4

Dimensional Stability

Polypropylene—epoxy compositions were prepared as described in Example 1 and analyzed for shrinkage as described above. Results are shown in Table 4.

TABLE 4

| Shrinkage under stress | |
|---|---|
| Epoxy % by weight | Shrinkage, % |
| 0 (comparative) | 11.83 |
| 4 | 8.49 |
| 15 | 4.88 |
| 22 | 5.99 |

The data of Table 4 show that increasing amounts of epoxy resin in the semi-IPN increased the dimensional stability of the film. Polyolefin films (or other forms, such as fibers, tubes, and profiles) having good dimensional stability are advantageous for certain industrial applications.

EXAMPLE 5

Modulus

Melt-processable semi-IPNs were prepared in batch mode in a heated, internally-stirred Brabender mixer (C. W. Brabender Instruments, Inc., South Hackensack, N.J.) equipped with sigma blades operated at approximately 100 rpm. Formulations varying in epoxy resin content were prepared, as shown below. Polypropylene (DS5D45, available from Shell Chemicals, Houston, Tex.) was added to the mixer with stirring and heating to 185° C. for 5 minutes. The temperature of the mixture was observed to increase to approximately 205° C. due to stirring friction. A mixture of EPON™ 828 epoxy resin (available from Shell Chemicals) containing 1% by weight organometallic complex salt photoinitiator ($\eta^6$-xylenes (mixed isomers))($\eta^5$-cyclopentadienyl)Fe$^{+1}$ SbF$_6^-$, prepared as described in U.S. Pat. No. 5,089,236, in the proportions shown in Table 6, was then added and stirring was continued for 2 minutes. The mixture was removed from the reactor and pressed twice at 195° C. in a Carver Laboratory press, Model C (Fred Carver, Inc., Wabash, Ind.) to obtain a free-standing film of from about 0.175 to about 0.38 mm (7–15 mils) thickness. The film was exposed to irradiation using super actinic lamps (TDL 15W/03 lamps, available from Phillips N.V., Holland) at 2.2 J/cm$^2$ for, e.g. 5 minutes for a 0.25 mm film.

Samples measuring 0.25 mm thick comprising several epoxy concentrations were cured and tested for tensile strength and tensile modulus, as shown in Table 5.

TABLE 5

| Tensile Strength and Tensile Modulus | | |
|---|---|---|
| Example | Epoxy resin wt % | Tensile Strength, MPa | Tensile Modulus, MPa |
| 5(a) (Comparative) | 0 | 33 | 648 |
| 5(b) | 6 | 31 | 575 |
| 5(c) | 10 | 27 | 685 |
| 5(d) | 20 | 25 | 691 |
| 5(e) | 30 | 22 | 800 |
| 5(f) | 40 | 18 | 796 |

The data of Table 5 show that, while tensile modulus (i.e., stiffness) of the semi-IPN of the invention increased with increasing epoxy resin content, there was a concomitant decrease in tensile strength.

EXAMPLE 6

Nonwoven Webs

A semi-IPN was prepared from 80 parts polypropylene resin (Exxon Escorene™ 3505G, available from Exxon Chemicals, Chicago, Ill.) and EPON™ 828 epoxy resin, containing 2% by weight FX-512 catalyst, using a twin-screw extruder essentially as described in Example 1. The outlet of the extruder was a multi-orifice die configured to prepare meltblown nonwoven webs. All zones of the extruder, the flow pipes, and the die were maintained at 230° C., while the die air temperature was 240° C. Fiber extrusion rate was 4.9 Kg/hr; the collector was 0.34 m from the die, with a take-up speed of 1 m/min; effective fiber diameter was 20 micrometers. The formed webs were exposed to irradiation from Fusion Systems "D" bulbs at a dosage of 3.0 J/cm$^2$ in the wavelength range of 320–390 nm. Tensile properties of the webs were obtained using a model UTSE-2 tensile testing unit (J. Chartillon & Sons, Greensboro, N.C.), as shown in Table 6 as averages of three tests.

Cured semi-IPNs having 10 parts and 20 parts epoxy resin were tested and were rated UL-94 "V-0," i.e., after flame time of less than 10 seconds and no ignition of cotton indicator pad.

TABLE 6

| Nonwoven Webs | | | | |
|---|---|---|---|---|
| Resin, parts | Test | Before Cure | After Cure | % Increase |
| 10 | Load At Break, Newtons | 28 | 35 | 25 |
| 10 | Extension, mm | 1.19 | 1.98 | 65 |

TABLE 6-continued

Nonwoven Webs

| Resin, parts | Test | Before Cure | After Cure | % Increase |
|---|---|---|---|---|
| 20 | Load at Break, Newtons | 8 | 9.8 | 22 |
| 20 | Extension, mm | 711 | 152 | −78 |

The data of Table 6 show that meltblown nonwoven webs were prepared from the compositions of the invention, after curing of the epoxy resin component, exhibited increased tensile properties over uncured webs.

EXAMPLE 7

Samples of epoxy-polypropylene semi-IPN having varying epoxy content were prepared as described in Example 2 (photocured while the polypropylene was still molten) and subjected to differential scanning calorimetry (DSC) to determine the effect of epoxy content on sample crystallinity. Assuming pure polypropylene has a 60% crystallinity and a value of 138 J/g for a polypropylene perfect crystal, the % depression was determined based on the area under the endotherm curve corresponding to the polypropylene fraction. Results are shown in Table 7.

TABLE 7

Semi-IPN Crystallinity

| Epoxy Type | % Epoxy | % Crystallinity Reduction |
|---|---|---|
| ERL ™-4221 | 4 | 4.7 |
| ERL ™-4221 | 15 | 12.3 |
| ERL ™-4221 | 22 | 23.7 |
| ERL ™-4221 | 33 | 2.3 |
| EPON ™-828 | 29 | 29 |

The data of Table 7 show that, for samples cured prior to cooling, crystallinity was noticeably reduced, generally in proportion to epoxy content. (Samples having reduced crystallinity exhibit increased transmission of light, i.e., show improved optical clarity, over pure polypropylene.)

EXAMPLE 8

The effect of epoxy content on onset of polypropylene crystallization was determined using samples containing various amounts of epoxy resin. The crystallization temperature was measured using differential scanning calorimetry (DSC). Polypropylene (Exxon 3445 homopolymer) was mixed with epoxy, extruded, and cured by UV radiation while molten. Crystallization temperatures are reported in Table 8.

TABLE 8

Crystallization Onset, $T_c$

| Epoxy | % Epoxy | $T_c$, °C. |
|---|---|---|
| (comparative) | 0 | 113.7 |
| ERL ™-4221 | 5 | 112.7 |
| ERL ™-4221 | 10 | 111.6 |
| ERL ™-4221 | 15 | 110.2 |
| ERL ™-4221 | 20 | 107.4 |
| ERL ™-4221 | 25 | 106.4 |

TABLE 8-continued

Crystallization Onset, $T_c$

| Epoxy | % Epoxy | $T_c$, °C. |
|---|---|---|
| ERL ™-4221 | 30 | 105.8 |
| EPON ™ 828 | 5 | 113.2 |
| EPON ™ 828 | 10 | 112.7 |
| EPON ™ 828 | 15 | 110.4 |
| EPON ™ 828 | 20 | 112.0 |
| EPON ™ 828 | 25 | 109.8 |
| EPON ™ 828 | 30 | 109.6 |

The data of Table 8 show that the thermodynamic miscibility of the epoxy resins with polypropylene extended to approximately 30% epoxy content. At higher epoxy loads, phase separation was seen and melt processability became difficult.

EXAMPLE 9

A semi-IPN containing 15% by weight EPON™ 828 epoxy resin in a polypropylene-polyethylene copolymer (DS7C50, Shell Chemicals) and 2% by weight FX-512 photocatalyst was prepared and cured under UV radiation while still molten, then subjected to dynamic mechanical analysis (DMA) at MHz over a broad temperature range. Tan δ for the sample was compared with pure copolymer, as shown in Table 9.

TABLE 9 tan δ

| Temp., °C. | Copolymer (Comparative) | Semi-IPN (15% Epoxy) |
|---|---|---|
| −50 | 0.020 | 0.021 |
| 0 | 0.053 | 0.078 |
| 50 | 0.070 | 0.107 |
| 100 | 0.099 | 0.120 |
| 150 | 0.125 | 0.150 |

Increased tan δ values indicated increased viscoelasticity of semi-IPNs of the invention, and, therefore, that there was an interface between the two phases. The interface was also reflected in an observed increase in compliance (conformability) of samples of the semi-IPN as compared to those of the pure copolymer (comparative).

EXAMPLE 10

Semi-IPNs of the invention were prepared using a Haake conical twin-screw extruder (Fisons Instruments, Beverly, Mass.) and a Brabender take-up system (C. W. Brabender Instruments, Inc., South Hackensack, N.J.), using an extruder temperature profile of 170°—185°—200°—190° C. and total residence times of five minutes. In this manner, poly(,propylene-co-ethylene), commercially available as DS7C50™ from Shell Chemicals, Houston, Tex., was mixed with 10% (by weight) PR-500™ epoxy resin composition containing a fluorene diamine curing agent (commercially available from 3M, St. Paul, Minn.) and a functionalized polyolefin. Uncured films from the extruder were collected as free-standing films. When tested, coupons of the film were cured at 225° C. for five minutes between Teflon™ release films in a Carver laboratory press (F. Carver, Inc., Wabash, Ind.), i.e., while the polyolefins were molten. Components and properties of the cured films are shown in Table 10.

TABLE 10

| Functionalized Polyolefin | % Functionalized Polyolefin | Young's Modulus Mpa | Tensile Strength Mpa | Elongation % | Overlap Shear Strength Mpa |
|---|---|---|---|---|---|
| none Control #1 | 0 | 426 | 22.7 | 1235 | 0 |
| none Control #2 | 0 | 652 | 17.6 | 186 | 0 |
| Epoxy-Propylene[1] | 5 | 567 | 19.2 | 317 | 14.3 |
| Epoxy-Propylene[1] | 10 | 660 | 21.5 | 864 | 13.3 |
| Questron ™[2] | 5 | 661 | 18.8 | 567 | 0.75 |
| Questron ™[2] | 10 | 642 | 18.3 | 670 | 0.78 |
| Elvax 350 ™[3] | 5 | 517 | 18.1 | 543 | 0 |
| Elvax 350 ™[3] | 10 | 489 | 16.1 | 550 | 0 |
| Abcite 1060WH ™[4] | 5 | 471 | 17.1 | 11 | 0 |
| Abcite 1060WH ™[4] | 10 | 490 | 17.5 | 8 | 0 |
| Epolene G3003 ™[5] | 2 | 747 | 21.0 | 210 | 16.1 |
| Epolene G3002 ™[5] | 2 | 700 | 2.6 | 95 | 15.0 |
| Epolene E-43 ™[5] | 2 | 602 | 20.3 | 566 | 11.7 |

*Control #1 contained no PR-500 epoxy resin composition
[1] An experimental epoxy/propylene copolymer available on request from DuPont Chemicals, Wilmington, DE, containing approximately 10% epoxy groups and having a Melt Flow Index of 50
[2] Questron ™ is a maleic anhydride-grafted polypropylene commercially available from Himont U.S.A., Inc., Wilmington, DE
[3] Elvax ™ is an ethylene-vinyl acetate copolymer commercially available from DuPont Chemicals
[4] Abcite 1060WH ™ is an ethylene copolymer having 10% carboxylic acid group content, commercially available from Union Carbide Corp., Danbury, CT
[5] Epolene G3003 ™, Epolene G3002 ™, and Epolene E-43 ™ are all maleic anhydride-modified polypropylene waxes, commercially available from Eastman Chemical Co., Kingsport, TN The data in Table 10 show that only the formulations that included a functionalized polyolefin provided cured compositions having sufficient overlap shear strength so as to be useful as adhesives or protective coatings (Comparative #1 and #2 vs., e.g., Epolene™ formulations). The table also shows that the PR-500™ epoxy resin composition was not substantially cured under the processing conditions in the extruder and that, even in the absence of added functionalized polyolefin, the cured epoxy resin enhanced the modulus and tensile strength of fully pre-polymerized hydrocarbon polyolefin (Comparative #1 vs. Comparative #2). Thirdly, it can be seen that the Epolene™ waxes provided a well-balanced enhancement of modulus, tensile strength, elongation and overlap shear strength.

EXAMPLE 11

Samples of semi-IPNs of the invention coming various amounts of calcium silicate, a commonly-used polymer filler material, were prepared in an extruder as described in Example 10. The formulation was: 88% by weight of DS7C50™ poly(ethylene-co-propylene) (Shell Chemicals); 2% by weight Epolene G3003™ maleated polypropylene wax (Eastman Chemical Co.) and either 0% or 10% by weight PR-500™ epoxy resin composition (3M Co.), to which was added calcium silicate as shown in Table 11.

TABLE 11

| CaSiO4 % | PR-500 ™ % | Young's Modulus MPa | Tensile Strength MPa |
|---|---|---|---|
| 5 | 0 | 753 | 25.2 |
| 10 | 0 | 787 | 23.6 |
| 15 | 0 | 617 | 19.8 |
| 20 | 0 | 748 | 20.2 |
| 25 | 0 | 543 | 12.1 |
| 5 | 10 | 707 | 23.9 |
| 10 | 10 | 840 | 26.0 |
| 15 | 10 | 728 | 22.6 |
| 20 | 10 | 685 | 22.7 |
| 25 | 10 | 789 | 18.3 |

Data in the table show that formulations that included cured epoxy resin had improved modulus and tensile strength, even at higher loading levels. Without wishing to be bound by theory, we believe that the formulations containing cured epoxy resin exhibited improved bonding between the hydrocarbon polyolefin matrix and calcium silicate filler particles, and were able to maintain excellent properties at high calcium silicate loading levels.

EXAMPLE 12

In order to test the adhesion of semi-IPNs of the invention to oily surfaces, a sample was prepared in an extruder as described in Example 10. The formulation was: 88% by weight of DS7C50™ poly(ethylene-co-propylene) (Shell Chemicals); 2% by weight Epolene G3003™ maleated polypropylene wax (Eastman Chemical Co.) and 10% by weight PR-500™ epoxy resin composition (3M Co.). Aluminum overlap shear coupons were cleaned with methyl ethyl ketone, wiped with a clean cloth, then coated with a steel-draw lubricant (MC-1™, commercially available from Novamax Technologies, Inc., Atlanta, Ga.). The lubricant was allowed to dry for 15 minutes, then overlap shear samples were prepared and tested. A formulation containing PR-500 and functionalized polyolefin had an overlap shear strength of 1.93 MPa, whereas samples prepared in the absence of either of these ingredients had zero overlap shear strength.

EXAMPLE 13

A semi-IPN film of the invention was prepared as described in Example 1, comprising 88% by weight of polypropylene (DS7C50, from Shell Chemicals), 2% by weight Epolene G3003 maleated polypropylene wax (Eastman Chemicals) and 10% by weight of PR-500 epoxy resin composition. A sample of the film was heated between two sheets of Kapton E™ polyimide film (commercially available from DuPont, Wilmington, Del.) at 204° C. for 30 minutes in a Carver laboratory press. The laminated construction thus prepared was cooled and subjected to a 180° peel test in an Instron testing machine. Peel force was measured to be 232 N/dm (13.2 lb/in$^2$).

EXAMPLE 14

Semi-IPNs of the invention were prepared in an extruder by the method of Example 10, wherein the semi-IPNs comprised an epoxy resin, a fully prepolymerized hydrocarbon polyolefin, and a fully prepolymerized functionalized polyolefin. Thus, polypropylene (DS7C50, Shell Chemicals) was mixed with EPON 828 epoxy resin (Shell Chemicals) and a number of functionalized polyolefins, in the proportion shown in Table 12, such that the total percentage of polypropylene equaled (100−the total % (epoxy+ functionalized polyolefin)). All samples that contained epoxy resin also contained 2% by weight of FX-512 photocatalyst, based upon the weight of epoxy resin present.

Composites were cured according to the tensile modulus, tensile strength, and overlap shear test procedures described previously. The results are shown in Table 12, below.

laboratory utility knife. At the center of the cut, an attempt was made to remove the film from the steel bar. Results are shown in Table 13.

TABLE 12

| Sample | % Epoxy | Functionalized polyolefin | % Funct. polyolefin | Young's Modulus MPa | Tensile Strength MPa | Elongation % | Overlap Shear Strength MPa |
|---|---|---|---|---|---|---|---|
| 10A | 0 | -None- Comparative 1ᵃ | 0 | 426 | 22.7 | 1235 | 0 |
| 10B | 0 | -None- Comparative 2ᵇ | 0 | 462 | 24.2 | 125 | 0 |
| 10C | 0 | -None- Comparative 3ᶜ | 0 | 527 | 19.1 | 17 | 0 |
| 10D | 0 | Epoxy-Propylene¹ Comparative 4 | 5 | 560 | 26.4 | 322 | 0 |
| 10E | 0 | Epoxy-Propylene¹ Comparative 5 | 10 | 545 | 26.7 | 832 | 0 |
| 10F | 5 | Epoxy-Propylene¹ | 5 | 460 | 21.9 | 832 | 10.8 |
| 10G | 10 | Epoxy-Propylene¹ | 5 | 586 | 24.0 | 49.5 | 10.9 |
| 10H | 5 | Epoxy-Propylene¹ | 10 | 505 | 22.8 | 762 | 7.3 |
| 10I | 10 | Epoxy-Propylene¹ | 10 | 492 | 25.3 | 560 | 9.2 |
| 10J | 5 | Elvax 350 ™² | 10 | 500 | 22.8 | 650 | 0 |
| 10K | 10 | " | 5 | 520 | 23.9 | 798 | 0 |
| 10L | 10 | " | 10 | 362 | 22.3 | 163 | 0 |
| 10M | 5 | Abcite 1060WH ™³ | 5 | 453 | 23.7 | 556 | 0 |
| 10N | 10 | Abcite 1060WH ™³ | 5 | 398 | 20.2 | 466 | 0 |
| 10P | 5 | Abcite 1060WH ™³ | 10 | 422 | 21.3 | 382 | 0 |
| 10Q | 10 | Abcite 1060WH ™³ | 10 | 373 | 21.8 | 183 | 0 |

ᵃPolypropylene film extruded at 0.75 mm and pressed down to 0.25 mm
ᵇPolypropylene film extruded and exposed to Fusion Systems D UV bulb at 3.1 J/cm²
ᶜPolypropylene film extruded and exposed to 200° C. and Fusion Systems D UV bulb at 3.1 J/cm²
¹An experimental epoxy/propylene copolymer available on request from DuPont Chemicals, Wilmington, DE, containing approximately 10% epoxy groups and having a Melt Flow Index of of 50
²Elvax ™ is an ethylene-vinyl acetate copolymer commercially available from DuPont Chemicals
³Abcite 1060WH ™ is an ethylene copolymer having 10% carboxylic acid group content, commercially available from Union Carbide Corp., Danbury, CT.

The data of Table 12 show that semi-IPNs of the invention can be prepared that include functionalized polyolefins and that these semi-IPNs exhibited one or more physical properties that were equal to or superior to those of compositions not containing the functionalized polyolefin.

EXAMPLE 15

Semi-IPN films of the invention were prepared as described in Example 1, containing 2% FX-512 catalyst (based upon the weight of epoxy resin) and either EPON 828 or ERL-4221 epoxy resin, as shown below in Table 13. To test the adhesion of the films to steel bars, the steel bars were cleaned by grit blasting then heated to approximately 200° C., whereupon the film specimen to be tested was laid on the hot bar, then pressed down on the bar with a soft rubber roller in order to provide uniform contact between the bar and the films. The bar-plus-film construction was subjected to UV irradiation under a General Electric 275 Watt Sunlamp at a distance of 4 cm from the sample for 20 minutes while still hot, then cooled to approximately 23° C. The specimens were submerged in tap water heated to 75° C. for two days. Dried samples were scribed with an "X" cut through the adhered film down to the steel substrate with a

TABLE 13

| Epoxy Resin | % Epoxy Resin | Qualitative Peel | Qualitative Adhesion |
|---|---|---|---|
| -None- Comparative | 0 | easy | none |
| EPON 828 | 5 | difficult | good |
| " | 14 | somewhat difficult | marginal |
| " | 29 | difficult | good |
| ERL 4221 | 4 | easy | none |
| " | 15 | difficult | good |
| " | 22 | easy | none |
| " | 33 | easy | none |

The data of Table 13 show that semi-IPN polyolefin films having improved adhesion to steel under hot, wet conditions can be prepared according to the invention.

Various modifications and alterations of this invention will become apparent to those skilled in the art without departing from the scope and spirit of this invention, and it should be understood that this invention is not to be unduly limited to the illustrative embodiments set forth herein.

We claim:

1. A curable composition comprising a molten mixture including;

a) 0.1 to 50 percent by weight of a curable epoxy resin, the weight percent being based on the total resin composition;

b) an effective amount of a curative for the curable epoxy resin, said curative being stable at temperature of mixing of the components;

c) 50 to 99.9 weight percent of at least one of a fully prepolymerized uncrosslinked hydrocarbon polyolefin resin and a fully prepolymerized uncrosslinked polyolefin resin functionalized with at least one polar group, the weight percent being based on the total resin composition, wherein said hydrocarbon polyolefin is present in the range of 25 to 99.9 weight percent of the total resin composition and said functionalized polyolefin is present in the range of 0 to 49.9 weight percent of the total resin composition, and at least one polyolefin resin providing a continuous phase, said composition being free of both epoxidized natural and/or epoxidized synthetic rubber.

2. The curable composition according to claim 1 wherein said curable epoxy is present in the range of 0.1 to 40 percent by weight and said fully prepolymerized polyolefin is present in the range of 60 to 99.9 percent by weight.

3. The curable composition according to claim 1 wherein said epoxy resin comprises at least one of a 1,2-, 1,3-, and 1,4-epoxide.

4. The curable composition according to claim 1 wherein said epoxy resin comprises at least one of an aliphatic, alicyclic, aromatic, and heterocyclic polyepoxide and a bifunctional monoepoxide.

5. The curable composition according to claim 1 wherein said epoxy resin comprises a bifunctional monoepoxide.

6. The curable composition according to claim 1 wherein said hydrocarbon polyolefin comprises at least one alpha-olefin or a copolymer thereof.

7. The curable composition according to claim 1 wherein said polar group of said functionalized polyolefin comprises at least one heteroatom selected from the group consisting of O, N, S, P, and halogen.

8. The curable composition according to claim 1 wherein said curative is at least one of a photoactivatable cationic catalyst and a thermal curing agent.

9. The curable composition according to claim 8 wherein said catalyst is an onium salt photoinitiator.

10. The curable composition according to claim 8 wherein said catalyst is a cationic organometallic complex salt.

11. The curable composition according to claim 8 wherein said thermal curing agent is an aliphatic Or aromatic primary, secondary, or tertiary amine.

12. The curable composition according to claim 8 wherein said thermal curing agent is selected from the group consisting of boron trifluoride complexes, imidazoles, hydrazines, and guanidines.

13. The cured composition according to claim 1 which is a semi-interpenetrating polymer network.

14. The cured composition according to claim 13 which is a free-standing film.

15. The cured composition according to claim 13 which is a foam, fiber or bead.

16. The cured composition according to claim 13 which is a protective or decorative coating on a substrate.

17. The cured composition according to claim 14 wherein said free-standing film is an adhesive or a backing for a tape.

18. The cured composition according to claim 16 wherein said substrate is a metal or a polymer.

19. The cured composition according to claim 13 which is a nonwoven article selected from the group consisting of 1) fibers of said polymer, and 2) polyolefin nonwoven fabric coated with said polymer.

20. The cured composition according to claim 13 which exhibits flame retardancy as defined in UL-94 with a classification of V-1 or V-0.

21. A method comprising the steps of:

a) providing a molten mixture including a curable liquid epoxy resin, an effective amount of a curative for the curable epoxy resin, said curative being stable at temperature of mixing, and at least one of a fully prepolymerized uncrosslinked hydrocarbon polyolefin resin and a fully prepolymerized uncrosslinked, functionalized polyolefin resin, said composition being free of epoxidized natural and/or epoxidized synthetic rubber, b) applying the mixture to a substrate, mold, or storage vessel, or processing into a free-standing film, and c) at any subsequent time, activating the curative to produce a semi-interpenetrating polymer network.

22. The method according to claim 21 wherein said epoxy resin and said photocatalyst are added in separate steps.

23. The method according to claim 21 wherein said composition further comprises an effective amount of an accelerator For said resin.

24. The method according to claim 21 wherein said composition further comprises an effective amount of an adjuvant sufficient to alter the physical characteristics of the cured semi-interpenetrating polymer network, said adjuvant being selected from the group consisting of thixotropic agents, pigments, fillers, clays, glass beads and bubbles, and reinforcing materials.

25. The method according to claim 21 which is a continuous process.

26. The method according to claim 21 which is a batch process.

27. The method according to claim 21 wherein said mixing step takes place at a temperature below the thermal activation temperature of the curative.

28. A curable composition comprising:

a) 0.1 to 50 percent by weight of a curable epoxy resin, the weight percent being based on the total resin composition;

b) an effective amount of a curative for the curable epoxy resin, said curative being stable at temperature of mixing of the components;

c) 50 to 99.9 weight percent of at least one of the fully prepolymerized uncrosslinked hydrocarbon polyolefin resin and a fully prepolymerized uncrosslinked polyolefin resin functionalized with at least one polar group, the weight percent being based on the total resin composition, wherein said hydrocarbon polyolefin is present in the range of 25 to 99.9 weight percent of the total resin composition and said functionalized polyolefin is present in the range of 0 to 49.9 weight percent of the total resin composition, said at least one polyolefin resin providing a continuous phase, said composition being free of both epoxidized natural and/or epoxidized synthetic rubber.

* * * * *

UNITED STATES PATENT AND TRADEMARK OFFICE
CERTIFICATE OF CORRECTION

PATENT NO. : 5,709,948

Page 1 of 2

DATED : January 20, 1998

INVENTOR(S) : Mario A. Perez, David A. Ylitalo, Thomas M. Clausen, Robert J. DeVoe, Kevin E. Kinzer, and Michael D. Swan It is certified that error appears in the above-identified patent and that said Letters Patent is hereby corrected as shown below:

In the Abstract

Line 3, "mount" should read -- amount --

Col. 1, Line 33, "epichiorohydrin" should read -- epichlorohydrin --

Col. 2, Line 28, "add)." should read -- acid). --

Col. 2, Line 36, "pitability" should read -- printability --

Col. 2, Line 63, "mount" should read -- amount --

Col. 3, Line 22, "thereof;" should read -- thereof, --

Col. 3, Line 25, "resins)" should read -- resin(s) --

Col. 3, Line 33, "thereof;" should read -- thereof, --

Col. 3, Line 53, "beating" should read -- bearing --

Col. 4, Line 40, "mounts" should read -- amounts --

Col. 5, Line 31, "thereof" should read -- thereof. --

Col. 7, Line 39, before "$R^3$, $R^4$" insert -- If --

Col. 8, Line 36, "$\eta 6$" should read -- $\eta^6$ --

Col. 8, Line 47, "cydopentadienyl)" should read -- cyclopentadienyl) --

UNITED STATES PATENT AND TRADEMARK OFFICE
CERTIFICATE OF CORRECTION

PATENT NO. : 5,709,948

DATED : January 20, 1998

INVENTOR(S) : Mario A. Perez, David A. Ylitalo, Thomas M. Clausen, Robert J. DeVoe, Kevin E. Kinzer, and Michael D. Swan It is certified that error appears in the above-identified patent and that said Letters Patent is hereby corrected as shown below:

Col. 13, Line 23, "LCK" should read -- LCR --

Col. 13, Line 53, "(D87C50," should read -- (DS7C50, --

Col. 13, Line 62, "(FX-5 12" should read -- (FX-512 --

Col. 14, Line 34, "185° C.)" should read -- (185° C.) --

Col. 14, Line 67, "(D87C50," should read -- (DS7C50, --

Col. 19, Line 49, "coming" should read -- containing --

Col. 23, Line 16, "composition, and at" should read -- composition, said at --

Col. 23, Line 48, "Or" should read -- or --

Col. 24, Line 27, "For" should read -- for --

Signed and Sealed this

Twelfth Day of May, 1998

Attest:

BRUCE LEHMAN

Attesting Officer

Commissioner of Patents and Trademarks